United States Patent Office 3,319,891
Patented May 16, 1967

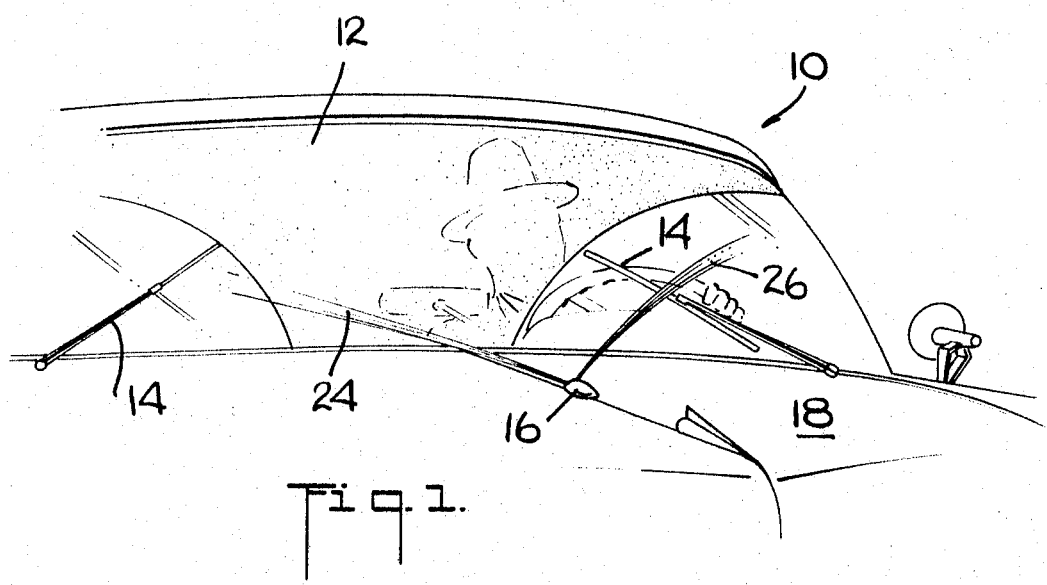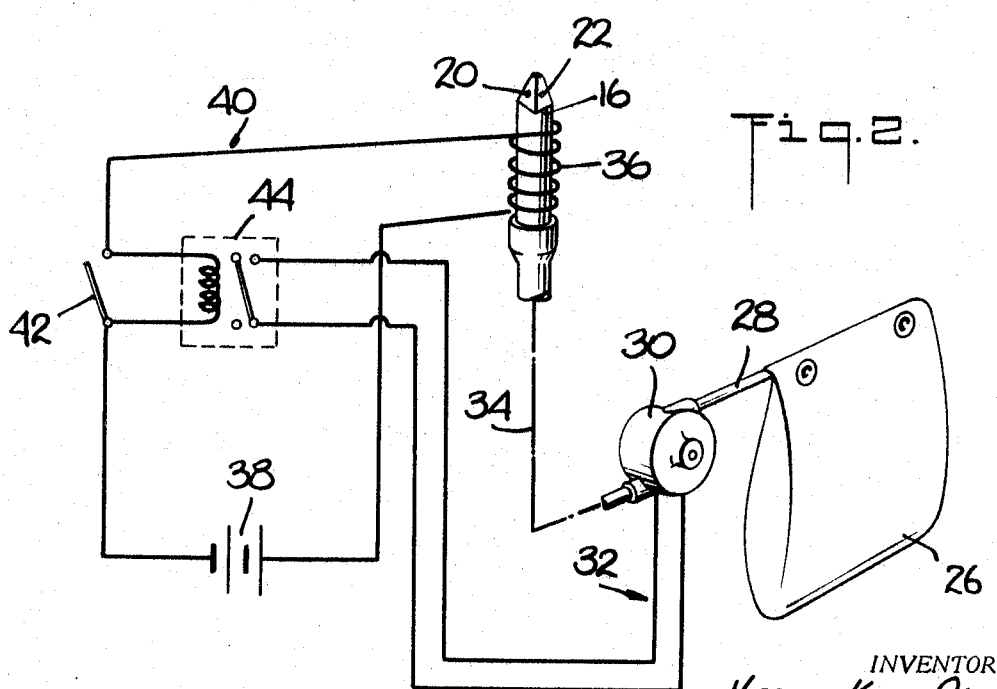

3,319,891
ELECTRICALLY HEATED WINDSHIELD WASHING NOZZLE IN TIME DELAY CIRCUIT
Virginia K. Campbell, 62 Middlesex Road,
Buffalo, N.Y. 14216
Filed July 6, 1965, Ser. No. 469,447
6 Claims. (Cl. 239—130)

This invention relates to improvements in windshield cleaning devices and more particularly to a windshield cleaning device that is operative throughout the entire year including the winter months in cold climates. The invention is particularly useful to operators of motor vehicles in cold weather, when making long trips on throughways or other modern highways, for removal of slush and road dirt which tends to be deposited upon the windshield during such trips.

Heretofore, considerable difficulty has been experienced with windshield washer systems normally utilized with present day motor vehicles when the ambient temperature falls below about 26° F. due to freezing of the cleaning solution. This occurs even though the standard antifreeze solutions recommended by the automotive manufacturers are employed. I have overcome this difficulty with my new and improved windshield device.

Briefly, the present invention contemplates the provision of a windshield cleaning device comprising a nozzle for directing a spray against the windshield to be cleaned, heating means for said nozzle, and pump means for forcing the spray liquid under pressure to said nozzle. Further, the device comprises control means for actuating the pumping means a preselected period of time after actuating the heating means. That is, according to the invention, the operator closes an electrical circuit which actuates a coiled heating element surmounted on the spray nozzle. Simultaneously with the closing of said circuit, a time delay switch is actuated so that after the coiled heating element has been in operation a predetermined period of time, such as 15 seconds, for example, pumping means are actuated through a second electrical circuit which is closed by means of the time delay switch. In this manner any residual moisture which may have accumulated in the nozzle is heated and cleared so that when the spray jet fluid appears at the nozzle it can readily be heated and passed therethrough to the windshield to be cleaned.

An important feature of the invention resides in the provision of a new and improved windshield cleaning device which reliably and successfully operates under adverse weather conditions such as during stormy or winter weather.

As another feature of the invention, there is provided a windshield cleaning device which is far superior to existing windshield cleaning devices, and which is easy to install and operate.

Still another feature of the invention resides in the provision of a new and improved windshield cleaning device which is economical to manufacture, which is compact, and which is durable and easy to maintain.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a perspective view showing a motor vehicle having a windshield cleaning device, according to the present invention, mounted thereon; and FIG. 2 is a detailed diagrammatic view showing the windshield cleaning device.

Referring particularly to FIG. 1 of the drawings, there is shown a motor vehicle indicated generally at 10, having a windshield 12, with the usual windshield wipers 14 adapted to pass thereover. A spray jet nozzle 16 is mounted on the hood of the motor vehicle 18 in a central position adjacent the windshield 12. One spray jet nozzle 16 is shown in FIG. 1 having outlets 20 and 22 (FIG. 2) for producing two separate spray streams 24 and 26 (FIG. 1). It will be appreciated that it is within the concept of this invention to employ two separate nozzles, one being positioned adjacent each side of the windshield, if desired.

As best seen in FIG. 2, a fluid reservoir 26 is provided which is normally located under the hood of the motor vehicle in a position where it can be readily refilled at convenient intervals of time at a service station or the like. Connected to the reservoir 26 is a conduit or tubing 28 which leads to fluid pump 30. This pump may be driven by an electrical motor or it may be driven by other suitable means such as the suction force of the intake manifold of the motor vehicle engine. For control purposes, the pump 30 is connected to and actuated by an electrical circuit indicated generally at 32 as will be described more fully hereinafter. Fluid from the pump 30 is discharged from the outlet thereof through a conduit or tubing 34 which leads to the spray jet nozzle 16. Embedded in the body of the spray jet nozzle 16 is the coil of a heating element 36. It should be noted that the coil is disposed as close as possible to the tip or outlets 20 and 22 of the nozzle 16 so that the nozzle will be heated by conduction to clear the passage therein by melting any residual moisture. The heating element may be fabricated from any suitable material such as nickel-chromium steel, for example. This heating element uses, as its power source, the motor vehicle's battery 38 which is connected in a first electrical circuit designated generally at 40. Also connected in the circuit 40 is a manually operable switch 42 for opening and closing the circuit, as desired, by the motor vehicle operator. Circuits 32 and 40 are interconnected by means of a time delay relay 44, which may be of any suitable type such as a heater-bimetal type, for example.

In operation when the operator of the motor vehicle desires to clean the windshield, he closes the first electrical circuit 40 by means of switch 42. This actuates the heating element 36 which heats the spray jet nozzle 16. Simultaneously with the closing of the circuit 40, the time delay switch 44 is actuated so that after the coil heating element 36 has been in operation a predetermined period of time, such as 15 seconds, for example, switch 44 interconnects circuit 32 with circuit 40 so that the pump 30 is actuated, thereby causing fluid to flow under pressure from the reservoir 26 through the conduit 28, through the conduit 34 to the nozzle 16 where it is heated, and thence, discharged through the outlets 20 and 22 to the windshield 12. In this manner residual moisture which may have solidified in the passages of the nozzle 16 are melted, thereby clearing said passages, before a fluid pressure pulse is received. Further, when fluid is flowing through the nozzle, the heat from the heating element 36 heats the fluid so that hot fluid is discharged onto the windshield. This prevents a so-called "freeze-up" during operation of the device, and allows a continuous steady stream of fluid to reach the windshield for the cleaning thereof.

From the foregoing description it will be seen that I contribute by my invention a new and improved windshield cleaning device which reliably and successfully operates under cold or adverse weather conditions.

Although a particular embodiment of the invention is herein disclosed for purposes of explanation, further modification thereof, after study of this specification, will be apparent to those skilled in the art to which this invention pertains. Reference should accordingly be had to the appended claims in determining the scope of the invention.

What is claimed and desired to be secured by Letters Patent is:

1. A windshield cleaning device comprising, in combination, a nozzle for directing a spray against the windshield to be cleaned, heating means for said nozzle, pump means for forcing the spray liquid under pressure to said nozzle, control means for automatically actuating said pump means a preselected period of time after actuating said heating means.

2. A windshield cleaning device comprising, in combination, a nozzle for directing a spray against the windshield to be cleaned, a manually actuatable heater for said nozzle, a pump for forcing the spray liquid under pressure to said nozzle, and time delay means for actuating said pump maens a preselected period of time after actuation of said heater.

3. In combination with a motor vehicle having a windshield, a windshield washing device comprising a liquid pump and a battery; a spray jet nozzle positioned in front of and adjacent said windshield, means for supplying liquid from said liquid pump to said spray jet nozzle, a coil type heating element surrounding said nozzle and being connected in an electrical circuit in combination with said battery, and manual means for closing said circuit.

4. A windshield cleaning device for motor vehicles, comprising a nozzle for directing a spray against the windshield to be cleaned, means operable to deliver fluid to said nozzle, a first electric circuit containing a source of electrical potential and a manually operative switch, electrical heating means, for said fluid, series connected in said first circuit, a second circuit for energizing said fluid delivery means, a timed delay switch interconnecting said first and second circuits whereby said second circuit is energized a predetermined period of time after energization of said first circuit.

5. A windshield cleaning device for motor vehicles, comprising a spray jet nozzle for directing a spray against the outside of the windshield to be cleaned, a pump for delivering fluid to said nozzle, a first electrical circuit containing a battery and a manually operative switch, electrical heating means coiled around said nozzle adjacent the delivery end thereof, series connected in said first circuit, a second circuit for actuating said pump, a time delay switch interconnecting said first and second circuits, whereby said second circuit is energized a predetermined period of time after energization of said first circuit.

6. A windshield cleaning device for motor vehicles according to claim 5 wherein said time delay switch has a time delay period of the order of about 15 seconds, whereby said nozzle receives heat and clears itself prior to receipt of said fluid.

References Cited by the Examiner

UNITED STATES PATENTS

| | | | |
|---|---|---|---|
| 1,465,292 | 8/1923 | Wessig | 15—250.05 X |
| 1,933,220 | 10/1933 | Petree | 15—250.05 X |
| 2,832,086 | 4/1958 | Wells. | |
| 3,190,502 | 6/1965 | Knibb. | |
| 3,231,196 | 1/1966 | Gunnar et al. | 239—70 |
| 3,255,967 | 6/1966 | Kenney | 239—133 |

FOREIGN PATENTS 512,462   9/1939   Great Britain.

M. HENSON WOOD, JR., *Primary Examiner.*

VAN C. WILKS, *Assistant Examiner.*